United States Patent [19]

Inomata et al.

[11] 3,931,346

[45] Jan. 6, 1976

[54] PROCESS FOR PREPARING A POLYMERIZABLE DIENE POLYMER

[75] Inventors: Jihei Inomata, Komae; Seiichi Hino; Tatsuo Tani, both of Yokohama, all of Japan

[73] Assignee: Mitsubishi Chemical Industries Ltd., Tokyo, Japan

[22] Filed: Apr. 1, 1974

[21] Appl. No.: 456,655

Related U.S. Application Data

[63] Continuation-in-part of Ser. No. 276,788, July 31, 1972.

[52] U.S. Cl.. 260/635 E; 260/78.4 EP; 260/78.4 D; 260/85.1; 260/83.5; 260/82.1; 260/94.7 A; 260/94.7 HA
[51] Int. Cl.² .................... C08D 5/02; C08D 1/20
[58] Field of Search 260/94.7 A, 94.7 HA, 78.4 EP, 260/78.4 D, 85.1, 82.1, 635 E, 83.5

[56] References Cited
UNITED STATES PATENTS

| | | |
|---|---|---|
| 3,609,111 | 9/1971 | Kumanotani ............... 260/78.4 D X |
| 3,652,520 | 3/1972 | Ryan et al .................. 260/94.7 A X |
| 3,705,866 | 12/1972 | Shibata et al .............. 260/78.4 D X |
| 3,842,146 | 10/1974 | Milkovich et al .......... 260/94.7 A X |

Primary Examiner—William F. Hamrock
Attorney, Agent, or Firm—Oblon, Fisher, Spivak, McClelland & Maier

[57] ABSTRACT

A polymerizable diene polymer is prepared by reacting a polymerizable unsaturated carboxylic acid, anhydride, ester or acid halide with a polyhydroxydiene polymer having terminal and pendant hydroxy groups obtained from the reaction of one mole of a living polymer having a molecular weight of 500 to 10,000 which is prepared by reacting a conjugated diolefin or a mixture of said conjugated diolefin and a vinyl compound having the formula: $CH_2 = CR_1R_2$ wherein $R_1$ represents a hydrogen atom or an alkyl group and $R_2$ represents an aryl group or a pyridyl group in the presence of sodium or lithium metal or an organo sodium or lithium compound with 0.5 mole to 2.0 moles of epichlorohydrin, epibromohydrin, epifluorohydrin, chlorobutylene oxide or bromobutylene oxide.

6 Claims, No Drawings

PROCESS FOR PREPARING A POLYMERIZABLE DIENE POLYMER

CROSS-REFERENCE TO RELATED APPLICATIONS

This application is a continuation-in-part of application Ser. No. 276,788, filed July 31, 1972.

BACKGROUND OF THE INVENTION

1. Field of the Invention

The present invention relates to a process for producing a reactive liquid conjugated diene polymer. More particularly, the invention relates to a process for preparing a polymerizable diene polymer from a conjugated diene polymer.

2. Description of the Prior Art

Various processes for producing conjugated diene polymers containing reactive groups such as epoxy, hydroxyl, etc., are well-known to those skilled in the art. For instance, processes such as the reaction between a large excess of epichlorohydrin and a living polymer such as polybutadiene, and the reaction of a polyepoxide such as limonene diepoxide with living polybutadiene are well-known. However, deficiencies are inherent in the products of both reactions. The polymers prepared by the former process have reactive groups only at the terminal of the polymer, which results in a polymer difficult to cure. The polymers prepared by the latter process can be cured, but the cured polymers are much too brittle. Therefore, these products have not been of much commercial value.

SUMMARY OF THE INVENTION

Accordingly, it is an object of this invention to provide a process for producing a conjugated diene polymer containing pendant reactive moieties such as an hydroxyl group, a carboxyl group or a polymerizable unsaturated bond in the polymer chain.

It is another object of this invention to provide a process for producing a liquid conjugated diene polymer which is easily processed.

Yet another object of this invention is to provide a process for producing a polymerizable diene polymer which is easily cured from a liquid conjugated diene polymer to form various products from rubber-like elastomers to hard resins by treating the reactive group in the chain with a compatible curing agent.

Still another object of this invention is to provide a process for preparing a conjugated diene polymer useful in various applications such as electric insulators, sealers, shock absorbers, etc.

Briefly, these objects and other objects of the invention as hereinafter will become more readily apparent can be attained by a process for preparing a polymerizable diene polymer by reacting a polymerizable unsaturated carboxylic acid, anhydride, ester or acid halide with a polyhydroxydiene polymer having terminal and pendant hydroxy groups obtained from the reaction of one mole of a living polymer having a molecular weight of 500 to 10,000 which is prepared by reacting a conjugated diolefin or a mixture of said conjugated diolefin and a vinyl compounds having the formula: $CH_2 = CR_1R_2$ wherein $R_1$ represents a hydrogen atom or an alkyl group and $R_2$ represents an aryl group or a pyridyl group in the presence of sodium or lithium metal or an organo sodium or lithium compound with 0.5 mole to 2.0 moles of epichlorohydrin epibromohydrin, epifluorohydrin, chlorobutylene oxide or bromobutylene oxide.

DESCRIPTION OF THE PREFERRED EMBODIMENTS

The living polymers used as the starting material in this invention are liquid polymers having an alkali metal at both ends of the polymer. The polymers are prepared by reacting an alkali metal or an organo-alkali metal compound with a conjugated diolefin or a mixture of a conjugated diolefin and a vinyl compound and range in molecular weight from 500 to 10,000, and especially from 1,000 to 5,000. In order to prepare cured polymeric products having excellent low temperature characteristics, it is preferable to have a greater content of conjugated diolefin or diene units in the living conjugated diene polymer than vinyl units, and especially preferable to have 30 percent more diene units than vinyl units. The conjugated dienes, which are used as the monomer starting material of the liquid living polymer, can be butadiene-1,3; 2-methylbutadiene-1,3; pentadiene-1,3; 2,3-dimethylbutadiene-1,3; 1-phenylbutadiene-1,3; etc.

Vinyl compounds having the formula: $CH_2 = CR_1R_2$ used in conjunction with a conjugated diene can be vinyl aromatic compounds such as styrene, $\alpha$-methylstyrene, tert-butylstyrene, paramethoxystyrene and vinyltoluene; and vinyl pyridines such as 2-vinylpyridine and 4-vinylpyridine. The amount of the vinyl compound employed is dependent upon the physical characteristics desired in the cured product polymers and is usually less than 75 weight percent, preferably less than 50 weight percent and especially less than 25 weight percent based on the total monomer content of the product polymers.

The alkali metal used as the initiator in the process can be lithium, sodium, potassium, rubidium, cesium, etc. The organoalkali metal compounds used as the initiator can be an alkali metal complex of naphthalene, anthracene and biphenyl; a complex of dienes, such as the dimer, trimer and tetramer lithium complex of butadiene and isoprene; a complex of styrene and a dialkali metal hydrocarbon compound such as 1,4-dialkali metal butane; 1,5-dialkali metal pentane; 1,10-dialkali metal decane, 1,2-dialkali metal-1,2-diphenylethane, 1,4-dialkali metal-1,1,4,4-tetraphenylbutane. When a liquid living conjugated diene polymer having a high content of diene units is desired, lithium metal or organolithium compounds such as the dimeric lithium complexes of butadiene or isoprene are preferably used.

The alkali metal complexes of conjugated dienes can be prepared by the following process. An alkali metal is reacted with a polycyclic aromatic compound at −20°~30°C, preferably 0°-25°C, in a diluent to form an alkali metal complex of the polycyclic aromatic compound. The polycyclic aromatic compound can be naphthalene, biphenyl, phenanthrene, anthracene, etc., and is usually employed in the diluent at concentrations ranging from 200 to 500 millimol per litre. The polycyclic aromatic compound-alkali metal adduct is filtered to remove unreacted alkali metal, and then is reacted with any one of said conjugated dienes. It is necessary to conduct the reaction at temperatures lower than 0°C to prevent the formation of higher polymerization products of the conjugated diene. Preferably, the reaction is conducted at temperatures lower than −20°C and as low as −78°C. Suitable diluents include aprotonic Lewis bases such as aliphatic ethers, alicyclic ethers, aliphatic polyethers, aromatic ring containing ethers and tertiary amines. Specific examples include dimethyl ether, methylethyl ether, diethyl ether, diisopropyl ether, tetrahydrofuran, dioxane, diethyleneglycol dimethyl ether, ethyleneglycol dimethyl ether, anisole, ethylphenyl ether, trimethylamine, triethylamine, dimethylaniline, etc. Economic advantages are realized when the diluents are mixed with a hydrocarbon such as hexane, heptane, benzene, toluene, xylene, cyclohexane, methylcyclohexane, etc.

Using the aforementioned process, an initiator solution can be prepared containing a dialkali metal complex of an oligomer which is principally a dimer of a conjugated diene. In the preparation of a liquid living polymer using the above initiator, the polymerization is enhanced by the addition of a hydrocarbon solvent such as hexane, heptane, benzene, toluene, xylene, cyclohexane, methylcyclohexane, etc. Preferably, the hydrocarbon solvent contains a Lewis base in order to more uniformly react them. These Lewis bases can be oxygen containing Lewis bases such as dimethyl ether, diethyl ether, diisopropyl ether, tetrahydrofuran, dioxane, diethyleneglycol dimethyl ether, ethyleneglycol dimethyl ether, anisole and ethylphenyl ether; and nitrogen containing Lewis bases such as triethylamine, trimethylamine and dimethylaniline. However, the addition of a Lewis base to the solvent mixture causes a decrease in the content of diene units in the polymeric product. When a living polymer containing a high content of diene units is desired, the amount of Lewis base added to the reaction solution should be minimized.

The essential feature of this invention is the reaction of specific amounts of a haloalkyleneoxide with the liquid living polymers previously described. The haloalkyleneoxide compounds have the formula:

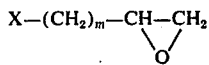

wherein X represents a halogen atom and m represents an integer greater than or equal to one. Suitable compounds include epichlorohydrin, epibromohydrin, epifluorohydrin, chlorobutylene oxide, bromobutylene oxide, etc. Preferably epichlorohydrin is employed. The amount of haloalkyleneoxide used in the reaction usually ranges from 0.5 mole to 2 moles and is preferably used in quantities from 0.6 to 1.7 moles per mole of liquid living polymer. When more than 2 moles of the haloalkyleneoxide is used per mole of liquid living polymer, the resulting polymer has haloalkyleneoxide units bonded at both ends of the polymer. These polymers are difficult to cure. When less than 0.5 mole of the haloalkyleneoxide units is used per mole of liquid living polymer, the number of haloalkyleneoxide units bonded to the liquid living polymer is less than one. The resulting polymers are also difficult to cure. However, when the amount of haloalkyleneoxide employed is within the indicated preferred range, polymers are obtained wherein several molecules of the living polymers are bonded through a haloalkyleneoxide unit to each other. When haloalkyleneoxide units are bonded to the living polymer, the epoxide ring of the haloalkyleneoxide is opened and the resulting oxide associates with the alkali metal cation present in the living polymer to form a functional group abbreviated as —OM, wherein M represents an alkali metal. Therefore, the molecular weight and the number of —OM groups in the product polymer is controlled by maintaining the amount of haloalkyleneoxide units added within the preferred range. The reaction of the liquid living polymer with the haloalkyleneoxide is conducted at $-50°\sim 100°C$, preferably 0°–80°C, in the same solvent used in the reaction for the polymerization of the living polymer. A satsifactory, purified, reactive conjugated diene polymer can be obtained by precipitating the polymer in the presence of an antioxidant such as di-tert-butyl-p-cresol in accordance with conventional methods.

The reactive conjugated diene polymer consists of modified haloalkyleneoxide units having pendant reactive —OM groups bonded to them between the living polymer units. Since the final product polymer is in a liquid form similar to the living polymer, processing of the polymers is made easier. The product polymer can have —OH groups at the ends of the polymer as well as at points within the chain. Discrimination between these two types of —OM groups is accomplished by referring to the internal groups as pendant —OM groups.

The pendant —OM groups of the conjugated diene polymer can be modified by treating the polymer with a protonic acid to convert it to its polyhydroxy form. The conversion is accomplished by neutralizing the —OM groups with a protonic acid at temperatures lower than 100°C, expecially between 0°–25°C. Suitable protonic acids include inorganic acids such as hydrochloric acid, sulfuric acid, phosphoric acid, and organic acids such as acetic acid. The protonic acid is used as an aqueous solution or as a solution of a lower aliphatic alcohol or a mixture thereof. Gaseous acids can also be conveniently used.

The conjugated diene polymer of the invention is referred to as a "polyhydroxydiene polymer." The liquid polyhydroxydiene polymer of this invention can be reacted with an unsaturated mono-or poly-carboxylic acid containing a reactive double bond to introduce a polymerizable double bond in the polymer chain. Suitable unsaturated carboxylic acids containing a polymerizable double bond include acrylic acid, methacrylic acid, cinnamic acid, maleic acid, fumaric acid, itaconic acid, 2-chloropropenic acid, chlorofumaric acid, bromofumaric acid, chloromaleic acid, bromomaleic acid, and the like. Other forms of the unsaturated carboxylic acid suitable for use include acid anhydrides; esters of alcohols such as methanol, ethanol, allyl alcohol, benzyl alcohol, butanol, 2-cyanoethanol, 2-ethylhexanol, phenol, cyclohexanol, isobutanol, propanol, amyl alcohol and the like or acid halides wherein the halides are chloride, bromide and iodide. The reaction of a polyhydroxydiene polymer with an unsaturated polycarboxylic acid can be conducted at temperatures ranging from 0° to 100°C, preferably from 30° to 80 °C in the same solvent used for the synthesis of the living polymer component of the polyhydroxydiene polymer. A one mole quantity of the unsaturated carboxylic acid is reacted per mole of —OM or —OH group in the polyhydroxydiene polymer. In the reaction, a radical polymerization inhibitor such as hydroquinone, benzoquinone, 2,6-dichlorobenzoquinone, 2,5-dinitrobenzoquinone, trinitrobenzene, dinitrobenzene, 2,6-ditert-butyl-p-cresol, etc. is added in quantities ranging from 0.01 to 2.0 percent by weight based on the polyhydroxydiene polymer. A product polymer is obtained containing a polymerizable unsaturated bond when the resulting reaction mixture is washed with water and the solvent is removed. The polymer can be purified by reprecipitation from a toluene-methanol solution in the presence of a radical polymerization inhibitor. An infrared spectrum of the product polymer indicates the presence of ester linkages in the polymer. This observation substantiates the reaction between the unsaturated carboxylic acid and the —OM or —OH groups of the polyhydroxydiene polymer.

As an example, the polymer prepared by reacting a polyhydroxydiene polymer with acrylic chloride would seem to have the following ester groups at points within the polymer chain:

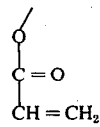

The conjugated diene polymer containing many polymerizable double bonds (hereinafter referred to as a polymerizable diene polymer) is also a liquid, and can be easily cured by adding a radical polymerization initiator, if needed, with the curing agent. Suitable radical polymerization initiators include organic peroxides such as dicumyl peroxide, 2,5-dimethyl-2,5-di(-tert-butylperoxy)hexane, tert-butyl-cumylperoxide, di-tert-butyl-peroxide, cyclohexanone peroxide, methylethylketone peroxide, acetyl peroxide, succinic peroxide, propionyl peroxide, lauroyl peroxide; azo compounds such as azobis(isobutyronitrile), azobismethylvaleronitrile, azobiscyclohexane carbonitrile. When an organic peroxide is used, a heavy metal compound which acts as an accelerator is added. The organic peroxides can also act as redox initiators by combining them with suitable reducing agents. Suitable curing agents for the polymerizable diene polymers include vinyl compounds such as styrene, 4-tert-butylstyrene, chlorostyrene, divinylbenzene, methylmethacrylate, ethylmethacrylate, propylmethacrylate, butylmethacrylate, octylmethacrylate, methylacrylate, ethylacrylate, propylacrylate, butylacrylate, octylacrylate, ethyleneglycoldiacrylate, diethyleneglycoldiacrylate, ethyleneglycoldimethacrylate, diethyleneglycoldimethacrylate, and polyallyl compounds such as diallylphthalate, triallylisocyanurate, diallyl ether, etc. The amount of the curing agent used ranges from 0 to 200 percent by weight, preferably from 50 to 100 percent by weight, based on the amount of polymerizable diene polymer. Curing can be conducted by admixing the polymerizable diene polymer with a polymerization initiator if needed, together with a curing agent, fillers, additives, etc. The polymer is shaped by casting, injection molding or transfer molding. Because the polymerizable diene polymer is a liquid, cured products can easily be obtained by simple procedures. Curing temperatures range from 0° to 250°C, usually from 0° to 200°C. Careful measures must be taken to exclude oxygen while curing the polymer since oxygen inhibits curing of the polymer. When the amount of the curing agent added to the polymer is relatively small, the resulting cured product is a strong rubber-like elastomer having sufficient elasticity even at low temperatures. If the amount of vinyl monomer incorporated in the polymerizable diene polymer is high, the resulting cured product is a hard resin possessing a high impact strength.

In summary, the polyhydroxydiene polymers of this invention are liquid polymers containing a certain number of original living polymer units throughout which are dispersed hydrocarbon units having pendant —OH groups attracted to them. The number of —OH groups and the molecular weight of the polymer can be controlled by carefully selecting the amount of haloalkyleneoxide to be reacted with the living polymer. The polyhydroxydiene polymer can be reacted with an unsaturated mono- or poly-carboxylic acid containing a polymerizable double bond to form a liquid polymerizable diene polymer. Various articles ranging from rubber-like elastomers to hard resins can be produced when the liquid polymerizable diene polymer is cured with an appropriate curing agent. Because the polyhydroxydiene polymers and the polymerizable diene polymers are liquids, handling of these polymers in subsequent processes is easy. For example, the polymerizable diene polymers can be easily cured while processing by pour molding, injection molding or transfer molding techniques even on a large scale. The rubber-like elastomers of this invention possess excellent physical characteristics such as high tensile strengths and good elongation properties which are the same or superior to those of the natural rubbers and synthetic rubbers.

Having now generally described the invention, a further understanding can be attained by reference to certain specific Examples which are provided herein for purposes of illustration only and are not intended to be limiting in any manner unless otherwise specified.

The molecular weight of each living polymer prepared in the process of preparing the polyhydroxydiene polymers of the present invention was simply determined from the ratio of the amount of olefin monomer(s) (molar amounts) used to prepare the living polymer to 0.5 times the molar amount of alkali metal or organo alkali metal catalyst used to prepare the living polymer. The data obtained by this method gave the number average molecular weights of the living polymers which were in close agreement with the average molecular weights of the living polymers. This method is described by M. Szwarc et al in J. Am. Chem. Soc. 79, 2026 (1957). The expression used to determine the average molecular weight of the living polymers is as follows:

$$\overline{M_w} \cong \overline{M_n} = \frac{\text{Monomers}}{0.5 \times \text{catalyst}}$$

EXAMPLE 1

A 0.26 g-atom quantity of lithium metal was reacted with 0.02 mole of purified naphthalene in 100 millilitres of diethyl ether under a purified argon atmosphere. A 0.2 mole quantity of isoprene was added to the reagent and was reacted at −25°C. After completion of the reaction, unreacted lithium metal was filtered. A 10 millimole quantity of the 0.5 N dilithium initiator reagent was added to a flask followed by a small amount of butadiene while under an argon atmosphere to uniformly polymerize it. After the butadiene was polymerized, the diethyl ether was removed under a reduced pressure. To the flask was added 500 millilitres of cyclohexane and 50 g of butadiene, and the butadiene was polymerized. After the polymerization, 15 millilitres of tetrahydrofuran and 0.6 millilitres of epichlorohydrin (0.8 moles per mole of the living polymer) were added and maintained at room temperature overnight while stirring. The resulting white, milk-colored, gel-like reaction product was decomposed by treatment with methanol-hydrochloric acid and isolated by conventional procedures. An analysis of the infrared spectrum confirmed that the polymer contained hydroxyl groups and that the micro-structure contained about 60 percent diene units. The inherent viscosity (25°C in toluene) of the resulting polymer was 0.37 dl/g. This data indicates that the molecular weight of the polymer treated with epichlorohydrin was three times that of the living polymer which was not treated with epichlorohydrin. This fact shows that the resulting polymer contained two moles of hydroxyl groups per mole of polymer.

EXAMPLE 2

A living polybutadiene was prepared by polymerizing 50 g of butadiene in the presence of 20 millimoles of the dilithium initiator prepared as in Example 1. The living polybutadiene was reacted with 1.56 millilitres of epichlorohydrin (1 mole per mole of living polymer). An analysis of the infrared spectrum confirmed that the resulting polymer contained hydroxyl groups and that the micro-structure contained about 50 percent diene units. The inherent viscosity of the resulting polymer was 0.34 dl/g and the molecular weight of the polymer treated with epichlorohydrin was five times that of the living polymer. This fact shows that the resulting polymer contained six moles of hydroxyl groups per mole of polymer.

EXAMPLE 3

The living polymer prepared by the process of Example 2 was reacted with 1.88 millilitres of epichlorohydrin (1.2 moles per mole of living polymer) as revealed in Example 1. An analysis of the infrared spectrum confirmed that the resulting polymer contained hydroxyl groups and that the micro-structure contained about 50 percent diene units. The inherent viscosity of the resulting polymer was 0.30 dl/g. The molecular weight of the polymer treated with epichlorohydrin was three times that of the untreated living polymer. This fact shows that the resulting polymer contained four moles of hydroxyl groups per mole of polymer.

EXAMPLE 4

An 8 g amount of sodium metal was reacted with 0.1 mole of purified naphthalene in 100 millilitres of tetrahydrofuran under a purified argon atmosphere. After the reaction, the unreacted sodium metal was filtered to obtain a 1.0 N sodium initiator solution. To a flask containing an argon atmosphere was added 40 millimoles of the initiator solution and 50 g of butadiene. After polymerization of the butadiene, 1.8 millilitres of epichlorohydrin (1.2 moles per mole of living polymer) was reacted with the polymer as revealed in Example 1. Analysis of the infrared spectrum confirmed that the resulting polymer contained hydroxyl groups and that the micro-structure contained about 100 percent vinyl units. The inherent viscosity of the resulting polymer was 0.33 dl/g. The molecular weight of the polymer treated with epichlorohydrin was four times that of the untreated living polymer. This fact shows that the resulting polymer contained five moles of hydroxyl groups per mole of polymer.

EXAMPLE 5

A 50 g quantity of butadiene was polymerized in the presence of 20 millimoles of a dilithium initiator prepared by reacting a small amount of naphthalene, lithium metal and isoprene in diethyl ether. The resulting living polybutadiene had a molecular weight of 2500, and was reacted with 30 millimoles of epichlorohydrin (1.5 moles per mole of living polymer) for 10 hours. An 80 millimole quantity of maleic anhydride in tetrahydrofuran was admixed with it and the mixture was reacted first at room temperature for 1 hour and then reacted at 70°C for 3 hours. The reaction mixture was stabilized by adding di-tert-butyl-p-cresol, and was isolated by conventional procedures. The resulting polymer had a number average molecular weight of 6000, contained 45 percent diene units and had a second transition temperature of 70°C. The yield of the product was 45 g. Analysis of the infrared spectrum of the polymer confirmed the presence of ester groups. A polymerizable polymer composition was formed by mixing 9.0 g of the polymer and 1.0 gram of styrene. A 0.2 g quantity of benzoyl peroxide was added to the composition and the mixture was cured at 100°C for 2 hours. The resulting solid elastomer had a tensile strength of 110 kg/cm$^2$, a yield point in its elongation of 350% and a hardness of 50 (Japan Ind. Standard).

REFERENCE 1

A 9.0 g quantity of polybutadiene untreated with epichlorohydrin and having a low molecular weight was prepared in methanol, as shown in Example 14. The living polymer was admixed with 1.0 g of styrene. To this composition was added 0.2 g of benzoyl peroxide and the mixture was cured at 100°C for 2 hours. However, only a semi-solid adhesive product was obtained.

The same process was repeated, except that 7.0 g of polybutadiene and 3.0 g of styrene were used. The resulting adhesive cured product had a tensile strength of 9 kg/cm$^2$ and a yield point in its elongation of 100 percent.

EXAMPLE 6

A polymer similar to the one prepared in Example 5 was prepared except that 80 millimoles of methylmethacrylate were employed instead of 80 millimoles of maleic anhydride. A composition was prepared using this polymer, and it was cured by the process shown in Example 5. The resulting solid elastomer had a tensile strength of 60 kg/cm$^2$, a yield point in its elongation of 350 percent, and a hardness of 45.

EXAMPLE 7

In 100 millilitres of tetrahydrofuran, 0.1 mole of naphthalene was reacted with 8 g of sodium metal. The excess sodium metal was filtered to prepare a 1.0N sodium initiator solution. A 50 g quantity of butadiene was polymerized in the presence of 40 millimoles of the initiator to yield a product having a molecular weight of 2500. The living polymer was reacted first with 1.8 millilitres of epichlorohydrin (1.15 moles per mole of living polymer) and then reacted with 80 millimoles of maleic anhydride in tetrahydrofuran. The reaction product was isolated by conventional procedures to yield a polymer having a molecular weight of 5000. Analysis of the infrared spectrum of the polymer confirmed the presence of ester groups. An 8.0 quantity of the polymer was admixed with 2.0 g of styrene to form a curable polymer composition. A 0.1 g quantity of benzoyl peroxide was added to the composition and the mixture was cured at 90°C for 3 hours. The resulting solid elastomer had a tensile strength of 92 kg/cm² and a yield point in its elongation of 250 percent.

EXAMPLE 8

The living polybutadiene polymer having a molecular weight of 2500 prepared as shown in Example 5 was reacted with 30 millimoles of epichlorohydrin (1.5 moles per mole of living polymer) at room temperature for 15 hours. This product was then reacted with acrylic chloride, and the resulting product was purified by conventional procedures. The resulting polymer had a molecular weight of 5500, 57 percent diene units and a glass transition temperature of −70°C. Analysis of the infrared spectrum of the polymer confirmed the presence of ester groups. An 8.0 g quantity of the polymer was admixed with 2.0 g of styrene to form a curable polymer composition. To the composition was added 0.1 g of benzoyl peroxide and the mixture was cured at 90°C for 3 hours. The resulting solid elastomer had a tensile strength of 60 kg/cm² and a yield point in its elongation of 310 percent.

EXAMPLE 20

The curable polymer composition of Example 5 was admixed with 0.5 g of cobalt naphthenate and methylethylketone peroxide. The mixture was cured at 20°C for 24 hours. The resulting elastomer had a tensile strength of 65 kg/cm², a yield point in its elongation of 400 percent, and a hardness of 55. It also had no adhesive properties.

EXAMPLE 21

A 25 g quantity of butadiene was polymerized in the presence of 10 millimoles of the dilithium initiator prepared as shown in Example 5. The resulting living polybutadiene polymer had a molecular weight of 2500 and was reacted with 15 millimoles of epichlorohydrin (1.5 moles per mole of living polymer) as shown in Example 5. A 40 millimole quantity of acrylic chloride was reacted with the living polymer. A 25 g yield of this polymer was obtained which had a molecular weight of 5200. An infrared absorption spectrum of the product confirmed the presence of an ester.

Having now fully described the invention, it will be apparent to one of ordinary skill in the art that many changes and modifications can be made thereto without departing from the spirit or scope of the invention as set forth herein. Accordingly,

What is claimed as new and intended to be covered by letters patent is:

1. A process for preparing a liquid polymerizable diene polymer, which comprises:

reacting a liquid polymerizable unsaturated carboxylic acid, anhydride, ester or acid halide with a liquid polydroxydiene polymer having terminal and pendant hydroxy groups obtained from the reaction of one mole of a living polymer having a molecular weight of 500 to 10,000 which is prepared by reacting a conjugated diolefin or a mixture of said conjugated diolefin and a vinyl compound having the formula: $CH_2=CR_1R_2$, wherein $R_1$ represents a hydrogen atom or an alkyl group and $R_2$ represents an aryl group or a pyridyl group in the presence of sodium or lithium metal or an organo sodium or lithium compound with 0.5 mole to 2.0 moles of epichlorohydrin, epibromohydrin, epifluorohydrin, chlorobutylene oxide or bromobutylene oxide.

2. The process of claim 1, which further comprises admixing the polymerizable diene polymer with a polymerizable vinyl monomer.

3. The process of claim 2, wherein said polymerizable diene polymer is used with 0 to 200 percent by weight of said polymerizable vinyl monomer based on the amount of polymerizable diene polymer at 0° to 250°C.

4. The process of claim 2, wherein said polymerizable vinyl monomer is styrene, 4-t-butylstyrene, chlorostyrene, divinylbenzene, methylmethacrylate, ethylmethacrylate, propylmethacrylate, butylmethacrylate, octylmethacrylate, methylacrylate, ethylacrylate, propylacrylate, butylacrylate, octylacrylate, ethyleneglycoldiacrylate, diethyleneglycoldiacrylate, ethyleneglycol dimethacrylate, diethyleneglycol dimethacrylate, diallylphthalate, triallylisocyanurate or diallyl ether.

5. The process of claim 1, which further comprises curing the polymerizable diene polymer with a radical polymerizing initiator.

6. The process of claim 5, wherein said radical polymerization initiator is dicumyl peroxide, 2,5-dimethyl-2,5-di(t-butylperoxy)benzene, t-butylcumylperoxide, di-t-butylperoxide, cyclohexanone peroxide, methylethylketone peroxide, acetyl peroxide, succinic peroxide, propionyl peroxide, lauroyl peroxide, azobis-(isobutyronitrile), azobismethylvaleronitrile or azobiscyclohexane carbonitrile.

* * * * *

UNITED STATES PATENT AND TRADEMARK OFFICE
CERTIFICATE OF CORRECTION

PATENT NO. : 3,931,346
DATED : January 6, 1976
INVENTOR(S) : Jihei Inomata, Seiichi Hino and Tatsuo Tani It is certified that error appears in the above-identified patent and that said Letters Patent are hereby corrected as shown below:

Insert --(30) Foreign Application Priority Data

| | | |
|---|---|---|
| 8/17/71 | Japan | 62822/1971 |
| 12/9/71 | Japan | 99643/1971 |
| 12/23/71 | Japan | 104849/1971-- |

Signed and Sealed this

*twenty-third* Day of *March 1976*

[SEAL]

Attest:

RUTH C. MASON
*Attesting Officer*

C. MARSHALL DANN
*Commissioner of Patents and Trademarks*